No. 864,765. PATENTED SEPT. 3, 1907.
R. ANTEAU.
SAFETY HANGER.
APPLICATION FILED FEB. 19, 1906.

WITNESSES:
E. F. Stewart
S. N. Acker

Richard Anteau,
INVENTOR.
By C. A. Snow & Co.
ATTORNEYS

UNITED STATES PATENT OFFICE.

RICHARD ANTEAU, OF WEST TOLEDO, OHIO.

SAFETY-HANGER.

No. 864,765.          Specification of Letters Patent.          Patented Sept. 3, 1907.

Application filed February 19, 1906. Serial No. 301,880.

*To all whom it may concern:*

Be it known that I, RICHARD ANTEAU, a citizen of the United States, residing at West Toledo, in the county of Lucas and State of Ohio, have invented a new and useful Safety-Hanger for Supporting Electric Conductors, of which the following is a specification.

This invention relates to hangers for elevated conductors and similar over-head cables and has for its object to provide a simple, inexpensive and efficient device of this character by means of which the conductor or cable may be supported in spaced relation to a line-wire so as to prevent sagging of the conductor.

A further object of the invention is to provide a hanger adapted to engage a supporting cable and having one end thereof provided with an enlarged head for engagement with a flexible supporting element, the latter being threaded through spaced eyes or loops and attached to the supported cable.

A further object of the invention is to generally improve this class of devices so as to increase their utility, durability and efficiency as well as to reduce the cost of manufacture.

With these and other objects in view the invention consists in the construction and novel combination and arrangement of parts hereinafter fully described, and illustrated in the accompanying drawings, it being understood that various changes in form, proportions and minor details of construction may be resorted to within the scope of the appended claims.

Figure 1:
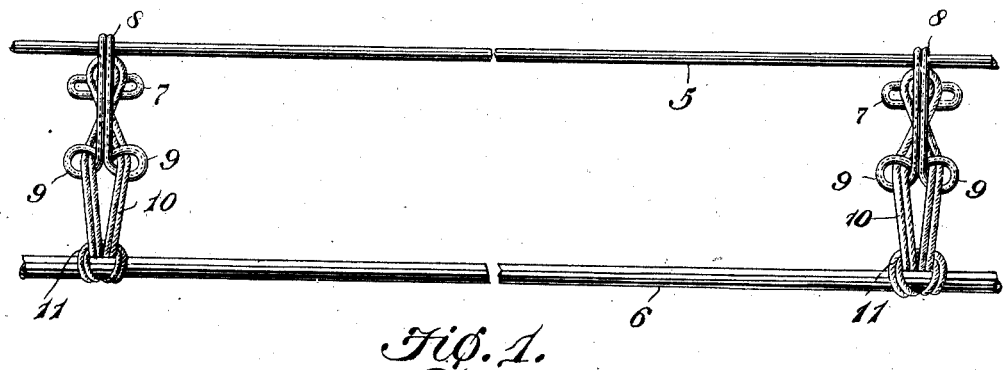
Figure 2:
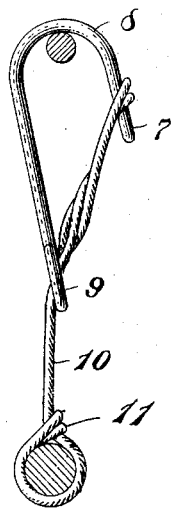
Figure 3:
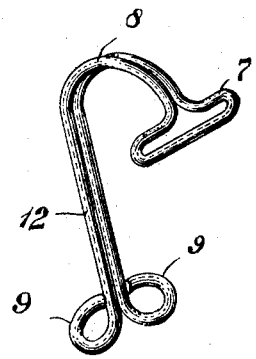

In the accompanying drawings forming a part of this specification: Figure 1 is a side elevation of a pair of spaced over head conductors, or cables showing my improved hanger in position thereon. Fig. 2 is a vertical sectional view and, Fig. 3 is a detail perspective view of one of the hangers detached.

Similar numerals of reference indicate corresponding parts in all of the figures of the drawings.

The device is principally designed for supporting over-head telegraph or telephone cables and by way of illustration is shown applied to a pair of over-head conductors in which 5 designates the over-head cable or line wire and 6 the supported cable.

The improved hanger is preferably formed of a single piece of wire an intermediate portion of which is bent laterally to form an enlarged head 7 and thence bent rearwardly and downwardly to form a hook 8 adapted to engage the supporting cable 5, the ends of the wire being extended in parallel relation and the terminals thereof bent laterally to form a pair of loops or eyes 9.

Engaging the head 7 is a cord or other flexible medium 10 preferably in the form of an endless loop or cable the legs of which are crossed in opposite directions and extended downwardly through the eyes 9 and thence around the supported cable 6, being secured thereto by a bight-hitch 11 as shown. It will thus be seen that the weight of the lower conductor or cable will cause the cord 10 to securely clamp the head 7 and at the same time grip the lower cable 6 and thereby prevent accidental displacement of the hanger.

In operation the hanger is placed in position by first securing the loop to the cable 6 and then passing the hook 8 over the cable 5 and subsequently drawing the cord or loop through the eyes 9 and passing the same over the head 7.

The hanger may be plated, japanned, galvanized, or otherwise covered to protect the same against the action of the elements and if desired a wire may be substituted for the supporting cord 10.

Attention is called to the fact that by having the enlarged head of the hook spaced from the parallel arms constituting the shank 12, the head will exert a spring action on the cord 10 and thus assist in keeping the same under tension at all times.

Having thus described the invention what is claimed is:

1. The combination with spaced over-head cables, of a hanger engaging one of the cables and provided with spaced eyes, and a supporting element operatively connected with one end of the hanger and extending through the eyes for attachment to the adjacent cable.

2. The combination with spaced over-head cables, of a hanger engaging one of the cables and provided at one end thereof with an enlarged end, and at the other end with eyes or loops, and a supporting element engaging the head and threaded through said eyes for attachment to the adjacent cable.

3. The combination with spaced over-head cables, of a hanger engaging one of the cables and provided at one end thereof with an enlarged head and at its other end with spaced eyes, and a supporting loop engaging the enlarged head and having its legs crossed in opposite directions and extended through the eyes for attachment to the adjacent cable.

4. The combination with spaced over-head cables, of a hanger engaging one of said cables and provided at one end thereof with an enlarged head and at its opposite end with eyes, and a flexible connection secured to the adjacent cable and threaded through said eyes for attachment to the enlarged head of the hanger.

In testimony that I claim the foregoing as my own, I have hereto affixed by signature in the presence of two witnesses.

RICHARD ANTEAU.

Witnesses:
JOHN C. HAYNES,
ADELIA ALLMON.